United States Patent [19]

Harris et al.

[11] 4,073,760
[45] Feb. 14, 1978

[54] METHOD OF PACKAGING ASPHALT MATERIAL AND IMPROVED PRODUCT RESULTING THEREFROM

[75] Inventors: Robert J. Harris, Marrero; Gail T. Sikes, Harvey, both of La.

[73] Assignee: H. C. Price Co., Bartlesville, Okla.

[21] Appl. No.: 708,196

[22] Filed: July 23, 1976

[51] Int. Cl.$^2$ .............................................. C08L 91/00
[52] U.S. Cl. ................... 260/28.5 AS; 206/524.7; 526/348; 526/351; 526/352
[58] Field of Search ............. 260/28.5 AS; 206/524.7

[56] References Cited

U.S. PATENT DOCUMENTS 2,918,940  12/1959  Carr ............................. 260/28.5 AS
3,853,800  12/1974  Haberl ......................... 260/28.5 AS

*Primary Examiner*—Melvyn I. Marquis
*Attorney, Agent, or Firm*—Lowe, Kokjer, Kircher, Wharton & Bowman

[57] ABSTRACT

A method of providing asphalt base coating material for pipe and a novel container for holding the coating material are the subject of the present application. An asphalt coating material comprising 10% to 25% by weight asphalt and 75% to 90% by weight sand-lime aggregate is used to coat the weld joints of pipe previously coated with similar material along its length for corrosion protection. The weld joint coating material is delivered to a coating station in easy to handle small size containers. The containers comprise no more than about 5% of the weight of the material contained thereby and are constructed primarily from a material containing at least one of the members of the group consisting of polyethylene, polypropylene and polyethylene-polypropylene copolymer. The containers are placed in a chopper where they are reduced in size along with the coating material. The chopped mixture of particles are then melted and stirred until a relatively even mixture of a flowable liquid is presented.

4 Claims, 3 Drawing Figures

METHOD OF PACKAGING ASPHALT MATERIAL AND IMPROVED PRODUCT RESULTING THEREFROM

This invention relates to corrosion protective coatings for pipe and, more particularly, to a container for packaging corrosion protective coating material used in conjunction with the weld joints and to a method of providing such a coating material using the containers.

Corrosion protective coatings for pipe of all sizes and types are well known in the industry. In many instances the corrosion coating is applied in a coating yard and the coated pipe then shipped to the job site where the individual pipe sections or joints are welded together to form the continuous pipeline. To permit welding of the joints together, an area of several centimeters at each end of the pipe joint is left free of the corrosion coating. When two joints of pipe are welded together, an area at the weld joint of approximately one meter in length will be free of the corrosion coating. It is thus necessary to apply a so-called field joint of coating material to this uncoated area.

For many years it was the practice in the industry to supply the components for the field joint coating material separately in relatively large packages or containers. The components were then mixed at the job site to prepare the field joint coating material. More recently, an effort has been made to supply the contractor with a premixed field joint coating material which need only be melted to a flowable liquid to prepare it for application at the job site. Such prepackaging was initially done in cardboard or similar containers which needed to be removed before the premixed coating material could be melted into a flowable liquid. Removal of the paper containers has been found to be a time consuming manual job and disposal of the containers is also likely to present problems, especially when pipe is being laid from an offshore lay barge.

It is, therefore, a primary object of the present invention to provide a weld joint coating material for pipe contained in a container which can be amalgamated into the coating material.

As a corollary to the above object, it is an objective of this invention to provide a container for coating material used in coating pipe which is compatible with the coating material.

As still another corollary to the object second above, an important aim of the invention is to provide a container which will have no deleterious affects on the coating material when amalgamated with it.

Another one of the objects of this invention is to provide a container for pipe coating material which when amalgamated into the material will enhance the physical properties of the coating.

A particularly important aim of the invention is to provide a container satisfying the criteria of the aims and objects set forth above which will not require excessively high temperatures to achieve amalgamation into the coating material, therefore making it practical to melt the container and the coating material at the job site with available equipment.

Still another object of this invention is to provide a method of delivering coating material for the weld joints of pipe utilizing the container of the present invention, whereby it is not necessary to remove the container from the material when preparing the coating composition.

Other objects of the invention will be made clear or become apparent from the following description and claims when read in light of the accompanying drawing wherein:

The coating material used for covering the weld joints of pipe coated with asphalt base corrosion coating may be between about 10% to 25% by weight asphalt and about 75% to 90% by weight aggregate. Any one of Grades I, II, or III asphalt (Asphalt Institute, specification series No. 7) is acceptable. The asphalt will have an operating temperature of no less than about 120° F. and a softening point of no less than about 150° F. (ring and ball USTM standard testing procedure). The flash point of the asphalt is about 450° F. The preferred material is Grade II asphalt which has an operating temperature of 150° F. and a softening point of 175° to 200° F.

The coating material is 75% to 90% aggregate which is preferably about a 50–50 mixture of sand and crushed limestone. The sand is preferably fine enough to pass 100% through a 6 mesh screen (U.S.A. Standard Testing Sieve). The crushed limestone is preferably fine enough for 100% to pass a 50 mesh screen and at least 75% by weight should pass a 200 mesh screen (both U.S.A. Standard Testing Sieve). Other equivalent materials may be used as the aggregate filler and it may be found desirable to incorporate small amounts of other materials to enhance the physical properties of the coating. For example, 0.1 to 0.15% by weight of glass fiber may be added for additional reinforcement and strength.

The sand and lime aggregage are directed to a batch mixing station where they are homogeneously dispersed throughout the asphalt which has been heated to a fluid state. When the coating material has been satisfactorily combined, a batch is deposited in individual containers 10, each of which is designed to hold about 50 pounds. The coating material will, manifestly, solidify in the containers and may then be easily transported to a pipe laying spread or lay barge for use by the pipeline contractor. By filling containers 10 to no more than about one inch from the top, the filled containers are easily and stably stacked one on top of the other. A number of containers may be stacked on a pallet in this manner for handling by conveyors and forklift equipment. The containers 10 are constructed primarily from a material containing one or more of the following: polyethylene, polypropylene or polyethylene-polypropylene copolymer. The total weight of the container should be less than 5% of the weight of the coating material contained thereby. A preferred formulation for the containers is about 10% to 15% by weight polyethylene, about 10% to 15% by weight polyethylene-polypropylene copolymer and about 70% to 80% polypropylene. In the preferred form, each container 10 comprises about 1% to 2% of the weight of the coating material contained thereby.

Figure 1:
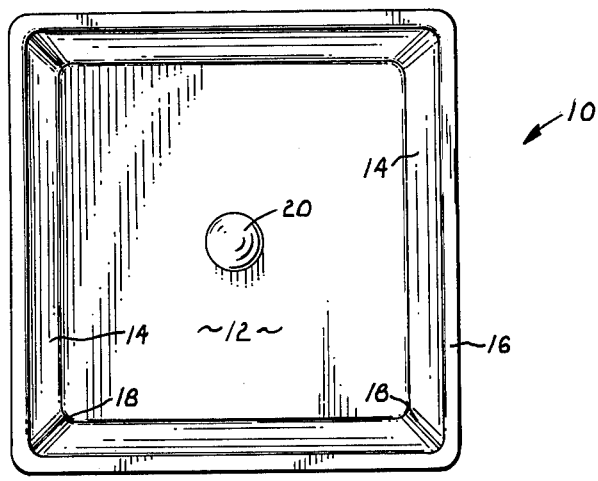
FIG. 1 is a top plan view of a container constructed according to the present invention.
Figure 2:
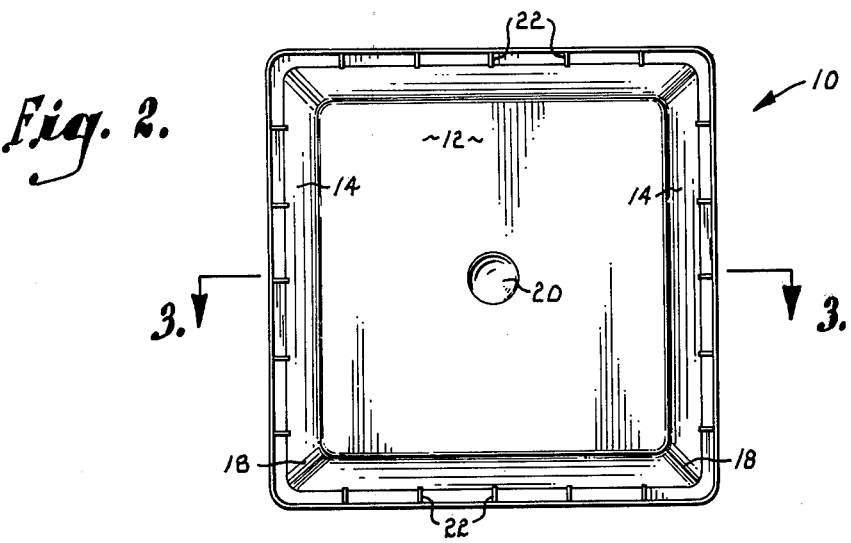
FIG. 2 is a bottom plan view of the container shown in FIG. 1.
Figure 3:
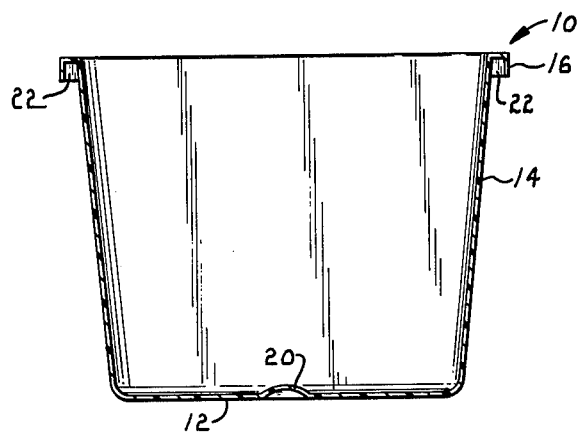
FIG. 3 is a horizontal, cross-sectional view taken along line 3—3 of FIG. 2.

Each container 10 is preferably injected molded into a generally rectangular configuration including a bottom wall 12, sidewalls 14 and a circumscribing peripheral lip 16 extending outwardly from the uppermost terminal edge of the sidewalls. Sidewalls 14 are disposed at an acute angle relative to bottom wall 12, thereby presenting a slightly tapered configuration. From viewing FIG. 2, it is seen that each of the corner sections 18 joining sidewalls 14 is rounded. A concave dimple 20 in bottom wall 12 facilitates removal of the molded container from its mold.

The peripheral lip 16 which is of generally L-shaped cross-sectional configuration provides reinforcing for the sidewalls 14 and is supported throughout its length by spaced-apart generally planar web portions 22 which extend between the outer leg of the lip and the adjacent wall 14. It is to be noted that lip 16 is of uniform width along its length except for those portions which are adjacent corner sections 18. In the area of corners 18, the lip is slightly wider so as to compensate for the rounded corner and to present a uniform external dimension of the container. In addition to reinforcing the container, lip 16 serves as a convenient handhold for workers to lift the container.

The tapered configuration of sidewalls 14 permits multiple containers to be stacked or "nested" one inside of the other, thereby greatly conserving the space required for shipping empty containers. To this end, the lip 16 serves another function of permitting the containers to be easily separated when nested one within the other, particularly after long periods of time when the containers may have somewhat of a tendency to adhere to one another.

Other equivalent formulations for the containers may be utilized although the melt flow index of the polymers and/or copolyers selected should be about 3.5 to 5.0 (ASTM). Trace amounts of impurities, such as may be found in reclaimed plastics, generally will have no detrimental affect.

The containers 10 with the coating material contained therein are fed into a conventional chopper to reduce their size. In the interest of brevity, the chopper will not be described in detail but suffice it to say that a device of the type commonly used to chop tree limbs may be employed. The size of the resulting particles of container and coating material is not critical, although the particles should be sufficiently small to readily melt in a short period of time.

Next, the chopped particles are directed to a melt kettle where they are mixed as the temperature is raised to melt the particles and present a flowable liquid. A temperature of about 300° F. to 400° F. is required to melt the container material into the asphalt. A temperature of about 375° F. is preferable. It has been found that, when a plastic material such as polyethylene, polypropylene, or polyethylene-polypropylene copolymer is attempted to be amalgamated into pure asphalt, it is not practical to achieve adequate melting and distribution of the plastic, in any reasonable time, when operating at temperatures below 400° F. If the temperature is raised above 400° F., there is an ever present danger of reaching the flash point of the asphalt. With the present invention, however, it has been found that the plastic container material may be amalgamated into the asphalt following the procedure outlined above in a relatively short time. Generally, utilizing a mixing tank of 2 tons capacity, the mixing time should be no less than about 45 minutes. Under normal conditions, a maximum melt time is 1 hour. It is thought that the presence of the aggregate filler material in the asphalt has a shearing action on the plastic and is the reason why the container material may be readily amalgamated into the asphalt.

It has also been found that the presence of the container material in the coating material increases some of the physical properties of the final pipe coating. Below is a comparative analysis showing cured coating material without the container material present and with the presence of approximately 1.7% container material.

|  | Tensile Strength (p.s.i.) | Flexural Props. (p.s.i.) | | Compressive Props. (p.s.i.) | | Crack Time secs. |
|---|---|---|---|---|---|---|
|  |  | Strength | Modulus | Yield | Ultimate |  |
| Standard Asphalt Coating* Material | 140 | 233 | 35911 | 135 | 168 | 91 |
| Asphalt Coating* Material With Container Plastic* | 192 | 287 | 39489 | 217 | 258 | 78 |

*according to the preferred embodiment of the invention

From the foregoing, it is apparent that the present invention provides for a substantially improved container for asphalt base pipe coating material and with an improved pipe coating resulting from amalgamation of the container into the coating material.

Having thus described the invention, we claim:

1. A method of providing asphalt base coating material for pipe wherein said material comprises about 10% to 25% by weight asphalt and about 75% to 90% by weight aggregate, said method comprising:
   supplying said coating material in a plurality of individual containers, each of which has a weight of no more than about 5% of the weight of the coating material contained thereby, and each of said containers being constructed primarily from a material containing at least one member of the group consisting of polyethylene, polypropylene, and polyethylene-polypropylene copolymer;
   chopping said containers and said coating material to reduce the size thereof and present a mixture of said container and said coating material particles;
   raising the temperature of said mixture to melt said particles and present a flowable liquid; and
   stirring said liquid to distribute the melted container particles throughout the melted coating material particles and present a coating composition.

2. A method as set forth in claim 1, wherein said temperature raising step comprises elevating said temperature to about 300° to 400° F.

3. A method as set forth in claim 1, wherein said chopping step comprises shredding said containers and said coating material.

4. A method as set forth in claim 3, wherein said container comprises about 10% to 15% by weight polyethylene, about 10% to 15% by weight polypropylene-polyethylene copolymer and about 70% to 80% polypropylene, and the total weight of said container comprises about 1.7% by weight of the coating material contained thereby.

* * * * *